United States Patent

[11] 3,563,160

| [72] | Inventor | Kaiichi Otsuka<br>Tokyo, Japan |
|---|---|---|
| [21] | Appl. No. | 795,887 |
| [22] | Filed | Feb. 3, 1969 |
| [45] | Patented | Feb. 16, 1971 |
| [73] | Assignee | Toriichi Shoji Kabushiki Kaisha<br>Tokyo, Japan<br>a corporation of Japan |
| [32] | Priority | Feb. 6, 1968 |
| [33] | | Japan |
| [31] | | 43/7714 |

[54] AUTOMATIC APPARATUS FOR BROILING SPITTED FOODS
6 Claims, 4 Drawing Figs.

[52] U.S. Cl. .................................................... 99/345, 99/420, 99/421
[51] Int. Cl. .................................................... A47j 37/04
[50] Field of Search ........................................... 99/345, 238.4, 324, 327, 346—347, 355, 360—362, 367, 373—375, 381, 384, 419—421, 423, 443—444; 107/19

[56] References Cited
UNITED STATES PATENTS

| 1,634,142 | 6/1927 | Hammond | 99/345 |
| 1,706,491 | 3/1929 | Jenkins | 99/421(V)X |
| 1,828,542 | 10/1931 | Padelford | (99/443(C))UX |
| 2,168,773 | 8/1939 | Parr | 99/423 |
| 2,533,080 | 12/1950 | Alexander | 99/346X |
| 2,552,621 | 5/1951 | Clay | 99/420X |
| 3,223,053 | 12/1965 | Jimenez et al. | 99/423X |
| 3,271,813 | 9/1966 | Gernandt et al. | 107/19X |

FOREIGN PATENTS

| 1,363,267 | 5/1964 | France | 99/443(C) |

Primary Examiner—Walter A. Scheel
Assistant Examiner—Arthur O. Henderson
Attorney—Marechal, Biebel, French & Bugg ABSTRACT: An automatic apparatus for broiling foods in the spitted form in which the spits of food are hung down from the holding arm of the circulating carrier are heated and then soy or the like liquid seasoning is applied and heated again and finished. Finished food is automatically released from the holding arm and received in a tray.

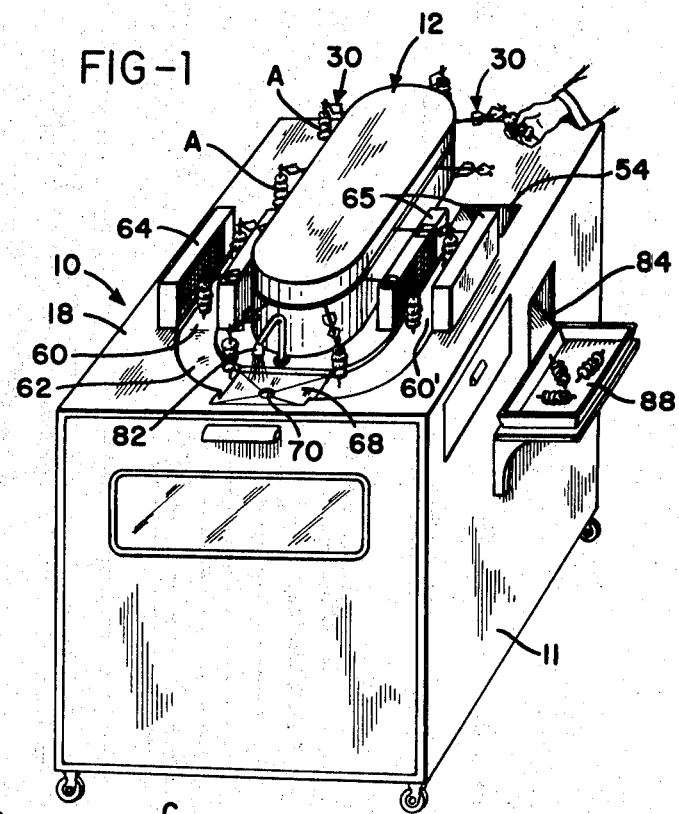
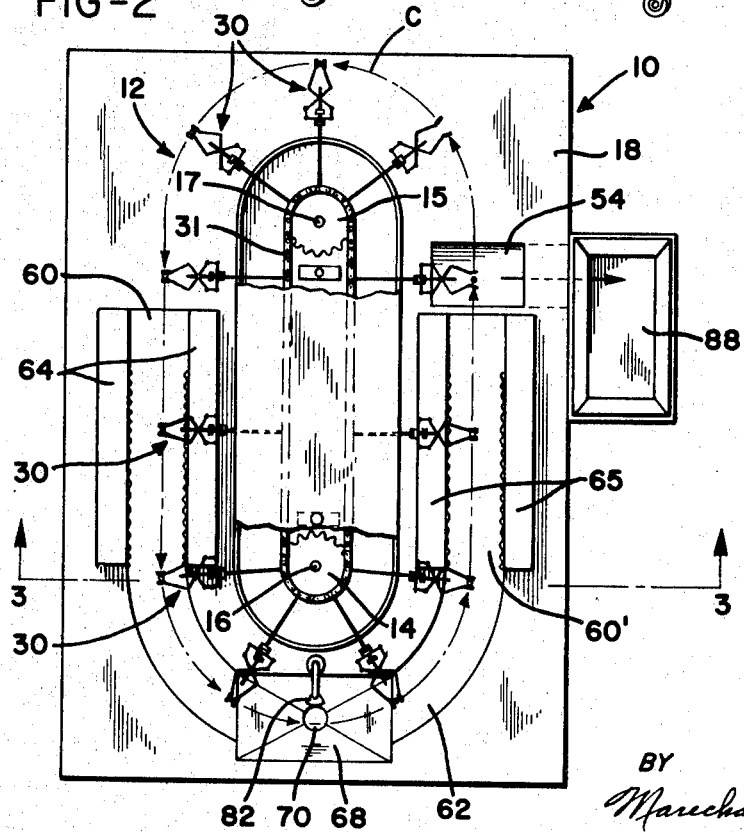
INVENTOR
KAIICHI OTSUKA

AUTOMATIC APPARATUS FOR BROILING SPITTED FOODS

BACKGROUND OF THE INVENTION

Conventionally, the spitted food such as the spitted chops of chicken are broiled with soy or the like seasonings one by one by hand. This operation is inefficient in production and moreover has the disadvantages of smoke rising and sooting of the foods.

SUMMARY OF THE INVENTION

The present invention relates to an automatic apparatus for broiling spitted foods with soy or the like seasonings, particularly suitable for broiling spitted chops of chicken.

It is one object of this invention, therefore, to provide an automatically operated apparatus for broiling the spitted foods with soy and the like in which the drippings from the foods are adapted not to contact to the fire so that the smoke rising or the sooting of the foods can be prevented.

Another object of this invention is to provide an improved holding device adaptable for hanging the spits of the foods downwardly so as to keep the holding device from the spray of the liquid seasonings which otherwise may be adhered and burned to the grips of said holding device and make these grips inoperable.

These and other objects of the present invention will be apparent from the following descriptions with reference to the accompanying drawings in which:

FIG. 1 is a perspective view of an automatic broiling apparatus illustrating the present invention;

FIG. 2 is a plan view of the apparatus shown in FIG. 1;

DESCRIPTION OF PREFERRED EMBODIMENT

Figure 3:
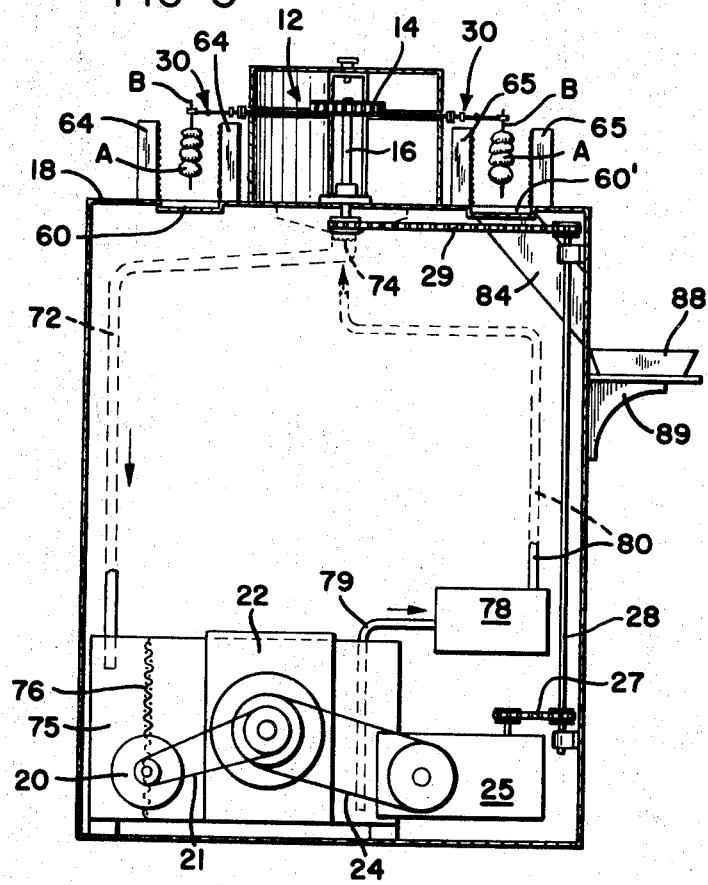
FIG. 3 is a sectional view taken on line 3-3 of FIG. 2, also showing an internally disposed driving mechanism of a carrier and piping for the liquid circulation.

Referring now to the accompanying drawings an automatic broiling apparatus 10 comprises a stand or cabinet 11 on which is supported a workpiece carrier 12 (FIGS. 2 and 3) in the form of an endless plate chain or the like mounted circulatively around chain wheels 14 and 15. The carrier 12 defines a circumferential path of movement for the workpiece A. The wheels 14 and 15 are, in turn, secured respectively to rotatable shafts 16 and 17. The wheels and associated shafts are located about the center portion of a top plate 18 of the work stand 11, with the shafts 16 and 17 projecting upwardly from said top plate 18.

A driving motor 20 (FIG. 3) which is positioned adjacent the bottom of the stand 11 is connected to the shafts 16 and 17 by a belt 21 through a variable speed gear box 22.

A further belt 24 connects the gear box 22 to a reduction gear 25, also located at the bottom. Power transmitting members arranged on the inside of the wall of the stand 11 include an output sprocket drive 27, a vertical shaft 28 and an upper sprocket drive 29 connected to the lower end of the shaft 16.

Figure 4:
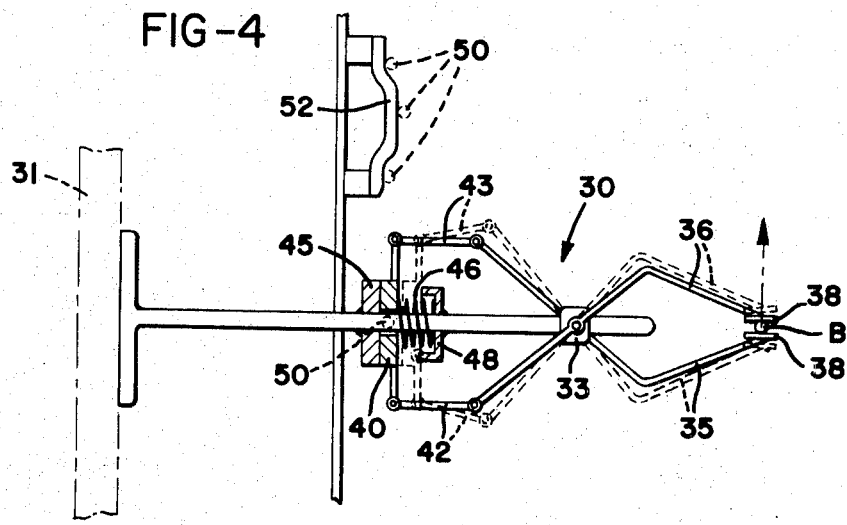
FIG. 4 is an enlarged plan view of a holding device, shown partially in section.

A spit holding arm 30 is provided on each chain plate or link 31 of the carrier 12, and each arm 30 extends horizontally and outwardly from the chain plate 31. As illustrated in FIG. 4, an anchoring block 33 is secured adjacent to the outer end of the spit holding arm 30, and a pair of toggle links 35 and 36, each having spit grips 38 on the outer ends thereof, are anchored pivotally to the anchoring block 33. A slide 40 is slidably mounted on the arm 30, and the inner ends of the links 35 and 36 are connected to the slide 40 by floating links 42 and 43. A stop member 45 fixed securely to the arm 30, and the slide 40 is normally forced toward the stop member 45 by means of a spring 46 received in a spring retainer 48 which is, in turn, secured to the arm 30.

The slide 40 is provided with a downwardly extending pin 50 adapted to engage with a guide 52 located adjacent to the work piece receiving port 54 (FIGS. 1 and 2) provided in the top plate 18 as set forth hereinafter. The slide 40 slides outwardly against the spring force when the pin 50 moves in engagement with the guide 52 and exerts a force to open the spit grips 38.

Grooves 60, 60' and 62 are formed on the top plate 18 corresponding to the path of movement of the spit grips 38 of the circulating carrier 12. Workpiece heating means are provided respectively at the straight grooves 60 and 60' and located on each side of the straight runs of the carrier 12. Each heating means comprises a pair of gas-fired infrared ray burners 64 and 65, provided respectively on each side of the straight grooves 60 and 60' extending vertically and facing each other. These burners are connected to the gas supplying pipes, not shown in the FIGS. These burners are of enough vertical height to heat a whole range of spitted foods.

A liquid receiving trough 68 is formed in about the center of the curved groove 62, and is formed in the shape of a pyramidal tray. The bottom of the trough defined by the grooves 60, 60' and 62 is tapered so as to let all drippings from food flow into the liquid receiving trough 68. At the bottom of the liquid receiving trough 68 an outlet port 70 is provided, and the port 70 is connected to a return pipe 72 (FIG. 3) which is arranged on the inside of the wall of the stand 11, and includes a filtering screen 74 on the upper end portion.

The lower other end of the return pipe 72 is inserted into a liquid storage tank 75 located at the bottom portion of the stand 11, and has a filtering screen 76 therein. A circulating pump 78 is also provided within the stand 11, and the intake port of the pump 78 is connected to a pipe 79, the opposite end of which opens to the bottom of the storage tank 75. The outlet port of the pump 78 is connected to the feeding pipe 80 arranged along the inside of the wall of the stand 11, the end portion of the feeding pipe 80 is extended upwardly from the top plate 18 and opened toward the liquid receiving trough 68 through a spray nozzle 82.

The workpiece receiving port 54 is connected to a delivery port 84 provided on the sidewall of the stand 11 by a chute 85. A receiving tray 88 is disposed beneath the chute 85 by means of supporting brackets 89. The carrier 12 is covered by a housing 100 having a slit 102 for allowing the movement of the spit holding arms 30 therethrough.

The operation of the foregoing automatic broiling apparatus is as follows: The infrared ray burner pairs 64 and 65 comprise the first and second food heating and cooking means, and are gas heated, although other infrared heating sources may be used. The liquid storage tank 75 is filled with precompounded liquid seasonings, and the liquid is sucked up from the tank 75 and sprayed out from the nozzles 82 through feed pipe 80 by driving the circulating pump 78. The sprayed liquid is collected to the liquid receiving trough 68 and returned to the liquid storage tank 75 through the outlet port 70, the filtering screen 75 and the return pipe 73. Returned liquid is passed through the filtering screen 76 of the tank 75 and sucked up again by the pump 78 and circulated repeatedly.

The driving motor 20 is started and the workpiece carrier 12 is circulated slowly toward the direction as indicated by arrow C; the driving force is transmitted from the motor 20 through the belt 21, the variable speed gear box 22, a belt 24, the reduction gear 25, the power transmitting members 27, 28 and 29; the rotating shafts 16 and 17 and the chain wheels 14 and 15 to the carrier 12.

Then the spits B of the workpieces A are fed to the spit grips 38 of the carrier 12 successively by hand or by any suitable means, by inserting the upper ends thereof to the spit grips 38 and hanging downwardly. Each spit B is retained securely between grips 38 by the exerting force of the spring 46 transmitted through the slide 40, the floating links 42, 43 and the links 35, 36.

As the workpiece carrier 12 moves, each spit B is passed first between the burners 64 of first workpiece heating means and the workpiece A is heated enough through the deep portions thereof. The spit B is then moved to the liquid applying portion, and the workpiece A (which may comprise pieces of chicken) is contacted by the spray of the liquid seasonings, (which may be soy in the case of chicken pieces) and the liquid soaks into the deep portions of the meat. Excess of the liquid falls into the liquid receiving trough 68 and returned to the tank 75.

The spit B is then passed between the burners 65 of the second heating means, and the workpiece A is heated and finished. The drippings from the workpiece are flowed through grooves 60 and 62 and collected to the liquid receiving trough 68.

When the finished spit B is moved to the workpiece receiving port 54, the pin 50 of the slide 40 engages with the guide 52 as set forth above and pushes the slide 40 outwardly against the exerting force of the spring 46 and exerts the links 35, 36 to open the spit grips 38. The workpiece spit B falls into the workpiece receiving port 54 and received in the tray 88 by sliding through the chute 85. The next spit B is fed while the spit grips 38 are still open as shown in FIG. 1.

The pin 50 is disengaged with the guide 52 after passing the receiving port 54, and the slide 40 is returned to abut the stop member 45 by the force of the spring 46 and the spit grips 38 are closed.

Thus it will be understood that the objects of the present invention are achieved in the foregoing way, and that an automatically operated apparatus is provided for broiling the spitted foods with soy and the like liquid seasonings and in which the drippings of the foods are not contacted to the fire or to the spit grips, so that the smoke rising or the sooting of the foods is prevented and the broiled foods of excellent quality and appearance can be obtained economically. The grips engage the spits at a region above the radiant heating means and the liquid applying means so as to be relatively free of the affects of smoke and cooking liquids.

Although the description and illustration have been made on a preferred embodiment of the invention, it is to be understood that the present invention will not be limited to the embodiment described and illustrated herein and changes and modifications may be made by those skilled in the art without departing from the spirit and scope of the invention.

I claim:

1. Automatic apparatus for the broiling of foods supported on a spit, comprising a stand, an endless workpiece carrier on said stand defining a circumferential path of movement for the cooking of spitted foods, said carrier having outwardly extending spit holding means spaced circumferentially for moving spits with food attached along said path, first and second workpiece cooking means positioned in spaced relation with respect to said path for cooking such spitted foods as they are carried by said carrier, said cooking means each including a pair of heating members positioned at opposite sides of the path in facing relation to each other, said workpieces holding means on said carrier including grips attached to support one said spit in downwardly hanging relation, a spit receiving station on said path, means for releasing said holding means at said spit receiving station, means forming a drip collecting groove on said stand corresponding to the path of movement of said spits, and a liquid seasoning applying means on said stand positioned between said first and second workpiece heating means adapted to apply liquid seasoning to said spitted foods when the same pass therethrough.

2. The apparatus of claim 1 in which said carrier and said spit grips are vertically spaced above said heating means so that the drippings of the food do not contact the grips and the grips tend to remain clean.

3. An automatic apparatus for broiling foods of spitted form as set forth in claim 1 wherein said heating members are infrared ray burners.

4. The apparatus of claim 3 in which said burners are gas fired.

5. Automatic apparatus for broiling foods supported on a spit, comprising a stand, an endless workpiece carrier on said stand defining a circumferential path of movement and having outwardly extending spit holding means spaced circumferentially on said carrier for gripping and supporting a spit and the food thereon for movement through said path, said spit holding means including grips which are adapted to retain and hang a spit downwardly in depending relation, a receiving station, means for releasing said grips at said receiving station, circumferentially spaced first and second cooking means positioned on said path in underlying relation to said spit holding means so that said grips are relatively free of the affects of smoke and cooking liquids, and liquid applying means positioned on said path between said working means for applying liquid seasoning to food carried on said spits as said spits move thereby.

6. An automatic apparatus for broiling foods of spitted form, comprising a stand, first and second cooking means, an endless workpiece carrier on said stand having workpiece holding means spaced circumferentially for moving spitted workpieces sequentially through said first and second cooking means, a workpiece receiving means and a guide rail adjacent to said workpiece receiving means, said each workpiece holding means includes an outwardly extending holding arm, pivotally anchored toggle link means having spit grips on outer ends and a slide means on inner ends thereof respectively, said slide means being provided with a guide rail engaging pin, a spring means provided between said slide means and holding arm, said holding means adapted to retain and hang the spit of workpiece downwardly and to release said spit at said workpiece receiving means when said engaging pin engages with said guide rail, drip collecting groove means on said stand corresponding to the path of said spit of workpiece, said first and second cooking means being provided on each side of said workpiece carrier, each comprising a pair of heating members facing each other along the path of said spit of workpiece, and a liquid applying means provided between said first and second cooking means adapted to apply liquid seasonings to said workpiece when said workpiece is moved thereto.